US012644725B2

(12) United States Patent
Chang et al.

(10) Patent No.: US 12,644,725 B2
(45) Date of Patent: Jun. 2, 2026

(54) ELECTRONIC APPARATUS AND CONTROLLING METHOD THEREOF

(71) Applicant: SAMSUNG ELECTRONICS CO., LTD., Suwon-si (KR)

(72) Inventors: Eunsoll Chang, Suwon-si (KR); Myounggon Kim, Seoul (KR); Jewoong Ryu, Suwon-si (KR); Aron Baik, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 121 days.

(21) Appl. No.: 18/139,448

(22) Filed: Apr. 26, 2023

(65) Prior Publication Data

US 2023/0266143 A1 Aug. 24, 2023

Related U.S. Application Data

(63) Continuation of application No. PCT/KR2021/015228, filed on Oct. 27, 2021.

(30) Foreign Application Priority Data

Nov. 25, 2020 (KR) ........................ 10-2020-0159444

(51) Int. Cl.
| | |
|---|---|
| *G01C 21/00* | (2006.01) |
| *G05D 1/00* | (2024.01) |
| *G06T 7/60* | (2017.01) |

(52) U.S. Cl.
CPC ....... *G01C 21/3841* (2020.08); *G05D 1/0246* (2013.01); *G05D 1/0274* (2013.01); *G06T 7/60* (2013.01)

(58) Field of Classification Search
CPC .. G01C 21/38; G05D 1/02; A47L 9/28; G06T 7/579
See application file for complete search history.

(56) References Cited

U.S. PATENT DOCUMENTS

| | | | |
|---|---|---|---|
| 6,172,601 | B1 | 1/2001 | Wada et al. |
| 7,155,308 | B2 | 12/2006 | Jones |
| 7,266,477 | B2 | 9/2007 | Foessel |
| 7,430,455 | B2 | 9/2008 | Casey et al. |

(Continued)

FOREIGN PATENT DOCUMENTS

| | | |
|---|---|---|
| CN | 103576154 A | 2/2014 |
| CN | 105869512 A | 8/2016 |

(Continued)

OTHER PUBLICATIONS

M. Asada, "Building a 3D world model for mobile robot from sensory data," Proceedings. 1988 IEEE International Conference on Robotics and Automation, Philadelphia, PA, USA, 1988, pp. 918-923 vol.2, doi: 10.1109/ROBOT.1988.12177. (Year: 1988).*

(Continued)

*Primary Examiner* — Hitesh Patel
*Assistant Examiner* — Tabitha Kress
(74) *Attorney, Agent, or Firm* — Sughrue Mion, PLLC

(57) ABSTRACT

An electronic apparatus includes a memory storing map data corresponding to a travelling space, the map data comprising Z-axis information. The electronic apparatus further includes a camera and a processor configured to: obtain first height information of an object included in one point of the map data, based on a first image obtained by the camera at a first location while the electronic apparatus is travelling, obtain second height information of the object included in the one point of the map data, based on a second image obtained by the camera at a second location that is different than the first location, and update the Z-axis information corresponding to the one point based on the first height information and the second height information.

16 Claims, 16 Drawing Sheets

(56) References Cited

U.S. PATENT DOCUMENTS

| | | | |
|---|---|---|---|
| 7,912,583 B2 | 3/2011 | Gutmann et al. | |
| 9,429,650 B2 | 8/2016 | Zeng et al. | |
| 10,444,759 B2 | 10/2019 | Douillard et al. | |
| 10,620,636 B2 | 4/2020 | Lee et al. | |
| 10,860,034 B1* | 12/2020 | Ziyaee | G06N 3/045 |
| 10,969,790 B2 | 4/2021 | Maeda | |
| 11,119,484 B2 | 9/2021 | Izawa et al. | |
| 11,182,625 B2 | 11/2021 | Lee et al. | |
| 11,417,007 B2 | 8/2022 | Kang et al. | |
| 11,714,423 B2 | 8/2023 | Douillard et al. | |
| 2006/0025888 A1 | 2/2006 | Gutmann et al. | |
| 2014/0035775 A1 | 2/2014 | Zeng et al. | |
| 2017/0336511 A1* | 11/2017 | Nerurkar | G06F 3/011 |
| 2018/0210448 A1 | 7/2018 | Lee et al. | |
| 2018/0364717 A1 | 12/2018 | Douillard et al. | |
| 2019/0080463 A1 | 3/2019 | Davison et al. | |
| 2019/0258878 A1 | 8/2019 | Koivisto et al. | |
| 2019/0294171 A1 | 9/2019 | Maeda | |
| 2019/0302793 A1 | 10/2019 | Leech et al. | |
| 2019/0377355 A1 | 12/2019 | Kwak et al. | |
| 2020/0026292 A1 | 1/2020 | Douillard et al. | |
| 2020/0064838 A1 | 2/2020 | Izawa et al. | |
| 2020/0114509 A1 | 4/2020 | Lee et al. | |
| 2020/0117198 A1 | 4/2020 | Whitman et al. | |
| 2020/0225673 A1* | 7/2020 | Ebrahimi Afrouzi | A47L 11/4011 |
| 2021/0150746 A1 | 5/2021 | Kang et al. | |
| 2022/0270198 A1 | 8/2022 | Han et al. | |

FOREIGN PATENT DOCUMENTS

| | | | | |
|---|---|---|---|---|
| CN | 110989619 A * | 4/2020 | | G01C 21/30 |
| EP | 3674830 A1 | 7/2020 | | |
| JP | 2000-161915 A | 6/2000 | | |
| JP | 4479372 B2 | 6/2010 | | |
| JP | 2018-68896 A | 5/2018 | | |
| JP | 2018068896 A * | 5/2018 | | A47L 11/4011 |
| JP | 2019-168925 A | 10/2019 | | |
| JP | 2020-524330 A | 8/2020 | | |
| KR | 10-2016-0071236 A | 6/2016 | | |
| KR | 10 2018 0112623 A | 10/2018 | | |
| KR | 10-2018-0136833 A | 12/2018 | | |
| KR | 10-2019-0015315 A | 2/2019 | | |
| KR | 10-2033143 B1 | 10/2019 | | |
| KR | 10-2021-0061839 A | 5/2021 | | |
| KR | 10-2021-0069984 A | 6/2021 | | |
| KR | 10-2022-0052241 A | 4/2022 | | |

OTHER PUBLICATIONS

Communication issued Apr. 4, 2024 by the European Patent Office in European Patent Application No. 21898377.3.

Written Opinion (PCT/ISA/237) issued from the International Searching Authority on Feb. 10, 2022 to International Application No. PCT/KR2021/015228.

International Search Report (PCT/ISA/210) issued from the International Searching Authority on Feb. 10, 2022 to International Application No. PCT/KR2021/015228.

Communication dated May 8, 2025 issued by the Korean Intellectual Property Office in Korean Patent Application No. 10-2020-0159444.

Communication dated Jan. 26, 2026, issued by the Korean Ministry of Intellectual Property in Korean Application No. 10-2020-0159444.

* cited by examiner

<u>100</u>

<u>100'</u>

ELECTRONIC APPARATUS AND CONTROLLING METHOD THEREOF

CROSS-REFERENCE TO RELATED APPLICATIONS

This application is a by-pass continuation application of International Application No. PCT/KR2021/015228, filed on Oct. 27, 2021, which is based on and claims priority to Korean Patent Application No. 10-2020-0159444, filed on Nov. 25, 2020, in the Korean Intellectual Property Office, the disclosures of which are incorporated by reference herein in their entireties.

BACKGROUND

1. Field

The disclosure relates to an electronic apparatus configured to update map data based on information about field of view (FoV) and a controlling method thereof.

2. Description of Related Art

Electronic apparatuses, such as guide bots or tail bots, for providing a service to a user in a specific space are available commercially. When a map for driving in a specific space is generated through various types of measurement devices provided in these commercially available electronic apparatuses, these electronic apparatuses cannot share a map generated between electronic apparatuses having different measurement devices as a result of generating a map without considering different characteristics of FoV according to the type of the measurement device.

Accordingly, there is a continuous need for a method for generating a map in consideration of FoV characteristics of various measurement devices so that the electronic apparatus may perform optimal travelling in a specific space.

SUMMARY

Provided are an electronic apparatus for updating map data in consideration of an FoV characteristic of a measurement device such the quality of a service provided to a user may be improved since the electronic apparatus having various sensors may travel efficiently, and a controlling method thereof.

According to an aspect of the disclosure, an electronic apparatus includes a memory storing map data corresponding to a travelling space, the map data comprising Z-axis information. The electronic apparatus may further include a camera and a processor configured to: obtain first height information of an object included in one point of the map data, based on a first image obtained by the camera at a first location while the electronic apparatus is travelling, obtain second height information of the object included in the one point of the map data, based on a second image obtained by the camera at a second location that is different than the first location, and update the Z-axis information corresponding to the one point based on the first height information and the second height information.

The second height information may include third height information other than the first height information. The processor may be further configured to additionally update the Z-axis information corresponding to the one point based on the third height information.

The processor may be further configured to update the Z-axis information corresponding to the one point based on maximum height information and minimum height information that are obtained based on the first height information and the second height information.

The processor may be further configured to: based on a plurality of objects being identified based on at least one of the first image or the second image, obtain height information of each of the plurality of objects based on the first height information and the second height information, and update the Z-axis information corresponding to the one point based on the obtained height information.

The processor may be further configured to: identify a first object region and a second object region based on the first height information and the second height information, the first object region being spaced apart from the second object region, obtain minimum height information of the first object region and maximum height information of the first object region, obtain minimum height information of the second object region and maximum height information of the second object region, and update the Z-axis information corresponding to the one point based on the minimum height information of the first object region, the maximum height information of the first object region, the minimum height information of the second object region, and the maximum height information of the second object region.

The processor may be further configured to: obtain a probability distribution corresponding to the one point based on the first height information and the second height information, and update the Z-axis information corresponding to the one point based on a variance value for the probability distribution.

The electronic apparatus may further include a LiDAR sensor. The processor may be further configured to: obtain fourth height information of a second object included in the one point of the map data based on a third image acquired by the LiDAR sensor, and update the Z-axis information corresponding to the one point of the map data based on the obtained fourth height information.

The electronic apparatus may further include a communication interface. The processor may be further configured to: receive fifth height information about the one point of the map data from an external device, and update the Z-axis information corresponding to the one point based on the received fifth height information.

The map data may further comprise X-axis information and Y-axis information. The X-axis information and the Y-axis information may indicate the one point on the map data. The processor may be configured to set a travelling path of the electronic apparatus to avoid another point in the map data where the Z-axis information has not completed an update.

The processor may be further configured to set a travelling path of the electronic apparatus based on form factor information of the electronic apparatus and the map data after the map data has been updated.

According to an aspect of the disclosure, a method of controlling an electronic apparatus includes: obtaining first height information of an object included in one point of map data, based on a first image obtained by a camera of the electronic apparatus at a first location while the electronic apparatus is travelling, the map data corresponding to a travelling space and comprising Z-axis information; obtaining second height information of the object included in the one point of the map data, based on a second image obtained by the camera at a second location that is different than the first location; and updating the Z-axis information corresponding to the one point based on the first height information and the second height information.

The second height information may include third height information other than the first height information. The method may further include additionally updating the Z-axis information corresponding to the one point based on the third height information.

The updating the Z-axis information may include updating the Z-axis information corresponding to the one point based on maximum height information and minimum height information that are obtained based on the first height information and the second height information.

The updating the Z-axis information may further include: based on a plurality of objects being identified based on at least one of the first image or the second image, obtaining height information of each of the plurality of objects based on the first height information and the second height information; and updating the Z-axis information corresponding to the one point based on the obtained height information.

The updating the Z-axis information may include: identify a first object region and a second object region based on the first height information and the second height information, the first object region being spaced apart from the second object region; obtaining minimum height information of the first object region and maximum height information of the first object region; obtaining minimum height information of the second object region and maximum height information of the second object region; and updating the Z-axis information corresponding to the one point based on the minimum height information of the first object region, the maximum height information of the first object region, the minimum height information of the second object region, and the maximum height information of the second object region.

The updating the Z-axis information may include: obtaining a probability distribution corresponding to the one point based on the first height information and the second height information, and updating the Z-axis information corresponding to the one point based on a variance value for the probability distribution.

The updating the Z-axis information may include: obtaining fourth height information of a second object included in the one point of the map data based on a third image acquired by a LiDAR sensor of the electronic apparatus, and updating the Z-axis information corresponding to the one point of the map data based on the obtained fourth height information.

The updating the Z-axis information may include: receiving fifth height information about the one point of the map data from an external device, and updating the Z-axis information corresponding to the one point based on the received fifth height information.

The map data may further include X-axis information and Y-axis information. The X-axis information and the Y-axis information may indicate the one point on the map data. The method may further include setting a travelling path of the electronic apparatus to avoid another point in the map data where the Z-axis information has not completed an update.

The method may further include setting a travelling path of the electronic apparatus based on form factor information of the electronic apparatus and the map data after the map data has been updated.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
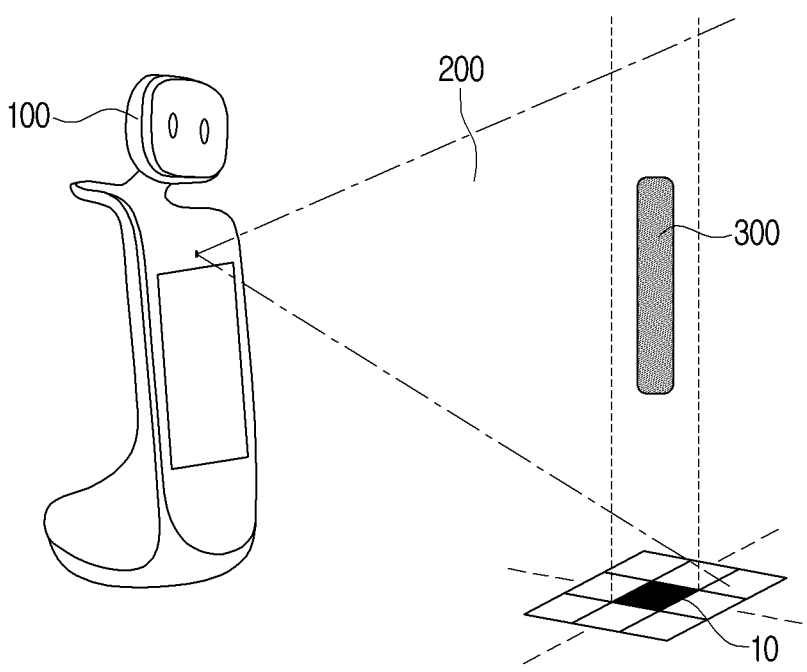
FIG. 1 is a diagram illustrating a method of identifying an object in consideration of an FoV characteristic according to an embodiment of the disclosure.

Embodiments of the disclosure will be described in greater detail with reference to the attached drawings.

The terms used in the disclosure and the claims are general terms identified in consideration of the functions of embodiments of the disclosure. However, these terms may vary depending on intention, legal or technical interpretation, emergence of new technologies, of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

It will be further understood that terms such as "including," "having," etc., may indicate the existence of the features, numbers, operations, actions, components, parts, or combinations thereof, disclosed in the specification, and are not intended to preclude the possibility that one or more other features may exist.

The expression "at least one of A or B" is to be understood to include only "A," only "B," or both "A and B".

As used herein, terms such as "first," and "second," may identify corresponding components, regardless of order and/or importance, and are used to distinguish a component from another without limiting the components.

If it is described that a certain element (e.g., first element) is "operatively or communicatively coupled with/to" or is "connected to" another element (e.g., second element), it should be understood that the certain element may be connected to the other element directly or through still another element (e.g., third element).

A singular expression includes a plural expression, unless otherwise specified. It is to be understood that the terms such as "comprise" may, for example, be used to designate a presence of a characteristic, number, step, operation, element, component, or a combination thereof, and not to preclude a presence or a possibility of adding one or more of other characteristics, numbers, steps, operations, elements, components or a combination thereof.

Terms such as "module," "unit," "part," and so on are used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

The term user in the disclosure may refer to a person using an electronic apparatus. Based on a premise that a space in which the electronic apparatus operates is an indoor space, the operations of the electronic apparatus will be described.

An embodiment of the disclosure will be described in more detail with reference to the accompanying drawings.

FIG. 1 is a diagram illustrating a method of identifying an object in consideration of an FoV characteristic according to an embodiment of the disclosure.

Referring to FIG. 1, map data corresponding to an indoor space may include X-axis information, Y-axis information, and Z-axis information. The information corresponding to one point 10 included in the map data may be a point including X-axis information, Y-axis information, and Z-axis information. The information corresponding to one point 10 may include information about an X-axis range, a Y-axis range, and a Z-axis range.

The electronic apparatus 100 may be implemented as a robot for providing a service to a user, but is not limited thereto.

The electronic apparatus 100 may identify an object 300 included in one point 10 included in the map data by using a sensor having a predetermined FoV 200. The electronic apparatus 100 may identify an object 300 included in an X-axis range, a Y-axis range, and a Z-axis range corresponding to one point 10, and update map data corresponding to one point 10 based on a Z-axis range in which the identified object is located.

The object 300 may be an object located at one point 10 of the indoor space, and when the object 300 is located within a threshold distance based on a traveling path of the electronic apparatus 100 and interferes with the driving of the electronic apparatus 100, the object 300 may be described as an "obstacle". A related-art electronic apparatuses update map data based on only X-axis information and Y-axis information among information corresponding to one point included in map data, and thus map data that does not reflect any Z-axis information may be generated, and thus it may be difficult to utilize corresponding map data in driving the electronic apparatus having various sizes. When information about the Z-axis is reflected, it is possible to generate map data based on Z-axis information which may not be accurate since the range of the FoV 200 of the electronic apparatus is not considered.

In order to solve the above-described problem, an electronic apparatus and a control method for updating map data in consideration of Z-axis information reflecting FoV information included in map data will be described.

Various embodiments capable of updating map data in consideration of Z-axis information for efficient driving of an electronic apparatus having various sensors will be described in more detail.

Figure 2:
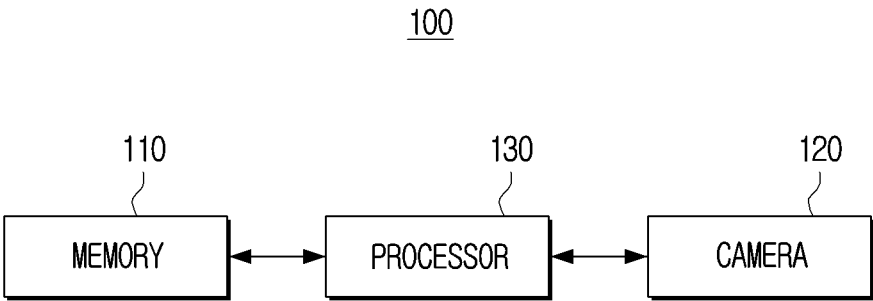
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, the electronic apparatus 100 may include a memory 110, a camera 120, and a processor 130.

The memory 110 may store data useful for the variously described embodiments. The memory 110 may be implemented as a memory embedded in the electronic apparatus 100, or may be implemented as a removable or modular memory in the electronic apparatus 100, according to the data usage purpose. For example, data for driving the electronic apparatus 100 may be stored in a memory embedded in the electronic apparatus 100, and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), or a hard disk drive or a solid state drive (SSD). In the case of a memory detachably mounted to the electronic apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, but the memory is not limited thereto.

The memory 110 may store map data corresponding to an indoor space in which an electronic apparatus travels and including Z-axis information.

The camera 120 may obtain an image by performing capturing of a region in FoV of the camera.

The camera 120 may include an object, for example, a lens for focusing, by an image sensor, visible light or signals reflected and received by the user, and an image sensor capable of sensing visible light or signals. The image sensor may include a 2D pixel array divided into a plurality of pixels.

The camera 120 may have a constant FoV, and the FoV may have the shape of a quadrangular pyramid having the camera 120 as a vertex of a pyramid. In addition, the camera 120 may be implemented by a depth camera.

The processor 130 may control the overall operation of the electronic apparatus 100. The processor 130 may be connected to each configuration of the electronic apparatus 100 to control the operation of the electronic apparatus 100 in general. For example, the processor 130 may be connected to the memory 110 and the camera 120 to control the operation of the electronic apparatus 100.

The processor 130 may be referred to as various names such as a digital signal processor (DSP), a microprocessor, a central processing unit (CPU), a micro controller unit (MCU), a micro processing unit (MPU), a neural processing unit (NPU), a controller, and an application processor (AP), but will be referred to as the processor 130 herein.

The processor 130 may be implemented as a system on chip (SoC) type or a large scale integration (LSI) type, or in a field programmable gate array (FPGA) type. The processor 130 may include volatile memory such as SRAM.

The processor 130 may obtain first height information of an object included in one point of map data based on a first image obtained by the camera 120 at a first location while the electronic apparatus 100 is travelling.

The object included in one point of the map data may be an obstacle located in an indoor space. The obstacle may be a furniture such as a chair and a table located on the floor of the space, a lighting device and a screen located on the ceiling of the space, or may be a drone floating in the space.

The height information may be information about a Z-axis range in which an object included in one point is located. In other words, the first height information may be information corresponding to the height of an obstacle located in the indoor space. The processor 130 may identify information about a Z-axis range from a bottom surface (Z=0) to a height of a chair as first height information in the case of the example chair, and may identify information about a Z-axis range from a lower surface of the lighting device to a ceiling surface as first height information in the case of a lighting device.

The processor 130 may obtain second height information of an object included in one point of map data based on a second image obtained by the camera 120 at a second location different from the first location. The processor 130 may update Z-axis information corresponding to one point based on the obtained first height information and second height information.

The second height information acquired by the second image may include third height information in addition to the first height information acquired by the first image. Specifically, the second location in which the electronic apparatus 100 acquires the second image may be a location where the electronic apparatus 100 is farther from the object than the first location in which the first image is acquired. When the camera 120 has a certain FoV, the second image acquired at the second location, which is a location farther away from the object, may include height information (third height information) over a wider Z-axis range with respect to the object than the first image acquired at the first location.

The processor 130 may additionally update Z-axis information corresponding to one point based on the third height information. The processor 130 may update only map data corresponding to third height information, which is a part not included in the first height information, among second height information included in the second image acquired at the second location, without updating map data corresponding to the first height information included in the first image acquired at the first location.

The processor 130 may update Z-axis information corresponding to one point based on the minimum height information and the maximum height information acquired based on the first height information and the second height information.

The processor 130 may obtain height information of each of a plurality of objects based on first height information and second height information when a plurality of objects are identified based on at least one of the first image or the second image. The processor 130 may update Z-axis information corresponding to one point based on the acquired height information.

The processor 130 may obtain minimum height information and maximum height information of a first object region and a second object region when a first object region and a second object region spaced apart from each other are identified based on first height information and second height information. The processor 130 may update Z-axis information corresponding to one point based on the obtained information.

Also, the processor 130 may obtain a probability distribution corresponding to one point based on the first height information and the second height information, and update Z-axis information corresponding to one point based on the dispersion value for the acquired probability distribution.

The electronic apparatus 100 may include a light detection and ranging (LiDAR) sensor, and the processor 130 may acquire fourth height information of an object included in one point of map data based on a third image acquired by the LiDAR sensor. The LiDAR sensor may be an equipment for measuring a distance between a sensor and an object through a laser. The LiDAR sensor may irradiate an optical pulse toward an object and map a distance to the object based on the characteristics of the reflected signal. The LiDAR sensor may have different optical characteristics than equipment, such as a depth camera, because it does not have an FoV of a pyramid shape and emits an optical pulse only in one direction.

The processor 130 may update Z-axis information corresponding to one point of the map data based on the acquired fourth height information.

The electronic apparatus 100 may further include a communication interface, and the processor 130 may update Z-axis information corresponding to one point based on received fifth height information when fifth height information for one point of map data is received from an external device.

The map data may further include X-axis information and Y-axis information, and the X-axis information and the Y-axis information may indicate a point on the map data. The X-axis information and the Y-axis information included in the map data may be information corresponding to the shape of one point on the map data. For example, if one point is a square-shaped cell, information about an X-axis range and a Y-axis range corresponding to the side length of the cell may be included in the map data.

The processor 130 may set a traveling path of the electronic apparatus 100 by avoiding a point in which the update of the Z-axis information is not completed on the map data.

The processor 130 may set a traveling path of an electronic apparatus 100d based on the updated map data and form factor information of the electronic apparatus 100.

Figure 3A:
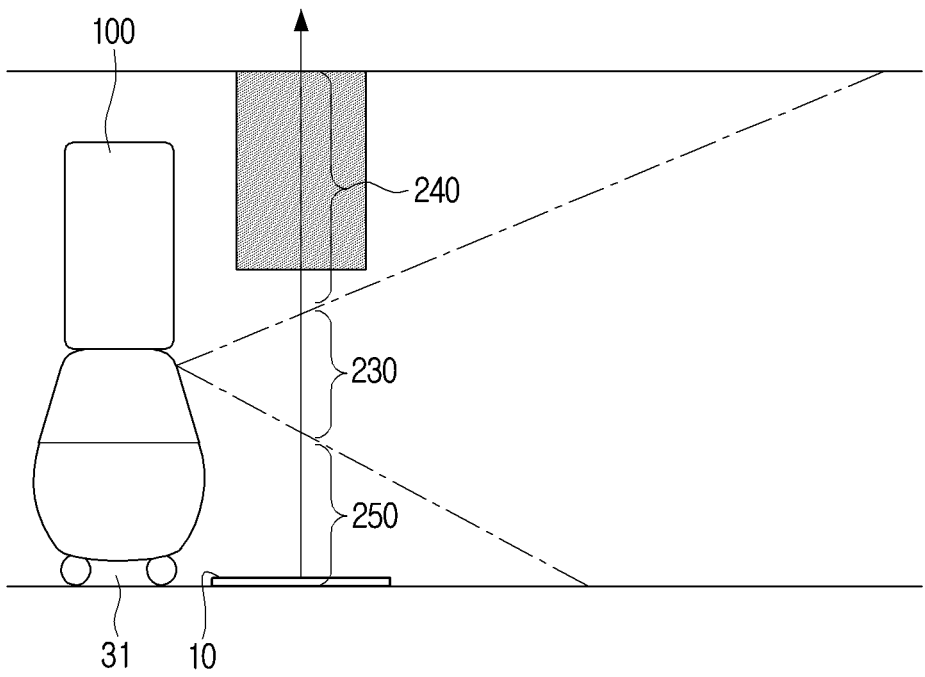
FIGS. 3A and 3B are diagrams illustrating a method of updating map data according to an embodiment of the disclosure.
Figure 3B:
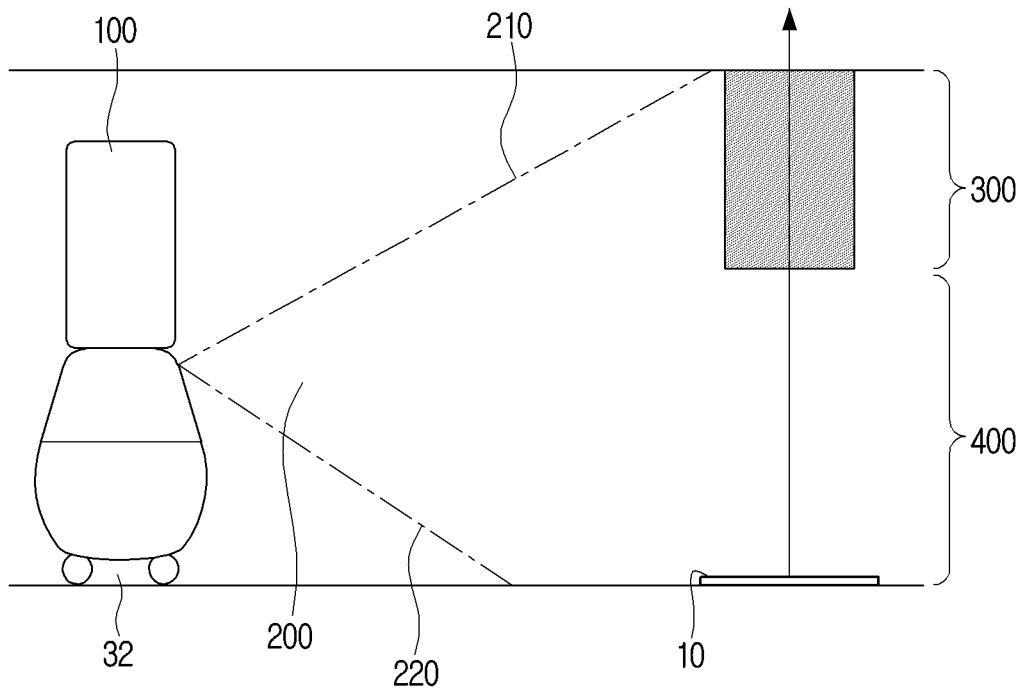

FIGS. 3A and 3B are diagrams illustrating a method of updating map data according to an embodiment of the disclosure.

FIG. 3A is a diagram illustrating a method by which the electronic apparatus 100 acquires first height information based on a first image acquired at a first location. The electronic apparatus 100 may obtain a first image through the camera 120 at a first location 31.

The camera 120 has a FoV 200 of a predetermined range formed between an upper surface 210 and a lower surface 220. In this case, the first height information corresponding to one point 10 of the map data may be obtained within a Z-axis range within a range 230 covered by the FoV 200 of the camera 120 among Z-axis information (floor-ceiling) corresponding to one point 10. In other words, the FoV 200 considered in the process of acquiring the first height information by the electronic apparatus 100 may be a vertical FoV.

The Z-axis information corresponding to one point 10 may not be acquired with respect to a region 240 above the upper surface 210 of the FoV 200 and a region 250 below the lower surface 220 of the FoV 200, and thus the processor

130 may not update Z-axis information corresponding to one point 10 for the corresponding regions 240, 250.

FIG. 3B is a diagram illustrating a method of obtaining second height information based on a second image obtained by the second positon by the electronic apparatus 100. The electronic apparatus 100 may obtain a second image through the camera 120 at a second location 32.

In this case, Z-axis information (floor-ceiling) corresponding to one point 10 is included in a range 230 covered by the FoV 200 of the camera 120. Therefore, the second height information for the object 300 included in one point 10 may be obtained for all z-axis ranges corresponding to one point 100. The FoV 200 may be a vertical FoV like a process of obtaining first height information. Consequently, the Z-axis information about the object 300 and the empty space 400 may be identified as second height information.

When the electronic apparatus 100 moves from a first location 31 to a second location 32, Z-axis information may be updated even for regions 240, 250 in which Z-axis information is not updated.

When the electronic apparatus 100 moves from the second location 32 to the first location 31, the processor 130 according to one example does not identify the object 300 with respect to the range 230 covered by the FoV 200, but does not update the Z-axis information with respect to other regions 240, 250, so that the processor 130 may still identify the one point 10 as a region that may not be driven.

The electronic apparatus 100 updates map data based on height information about an object included in the FoV of the measurement device in consideration of the FoV characteristics of the camera 120, and does not update the Z-axis information included in the map data for an area not included in the FoV, thereby generating map data that may be used for driving the electronic apparatus having different FoV characteristics of the camera provided with the camera on the device.

FIGS. 4A to 4D are diagrams illustrating various methods of updating map data according to an embodiment of the disclosure.

Figure 4A:
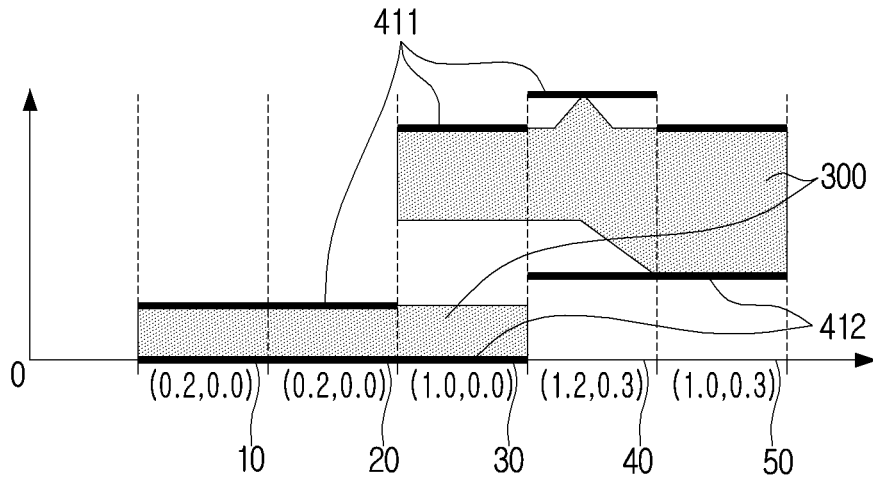
FIGS. 4A to 4D are diagrams illustrating various methods of updating map data according to an embodiment of the disclosure.

Referring to FIG. 4A, the processor 130 may update Z-axis information corresponding to one point based on the minimum height information and maximum height information obtained based on the first height information and second height information.

A plurality of points 10, 20, 30, 40, 50 and an object 300 located in an indoor space are shown in FIG. 4A. The object 300 may be a single object, but may be a group of objects composed of a plurality of objects. The processor 130 may obtain minimum height information corresponding to the lower surface 412 of the object 300 and maximum height information corresponding to the upper surface 411 of the object 300.

The processor 130 may update Z-axis information corresponding to a plurality of points 10, 20, 30, 40, 50 based on the obtained minimum height information and maximum height information.

Figure 4B:
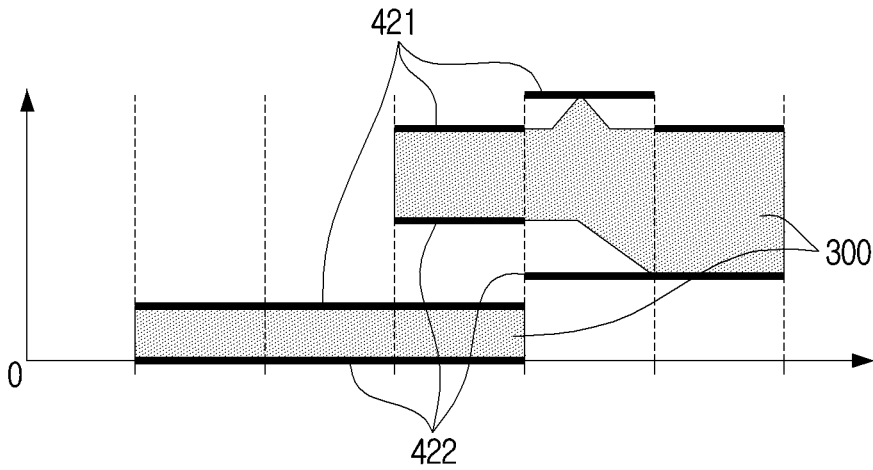

In FIG. 4B, it may be assumed that the object 300 included in a plurality of points 10, 20, 30, 40, 50 is a group of objects composed of a plurality of objects spaced apart from each other.

The processor 130 may acquire height information of each of a plurality of objects based on at least one of the first image or the second image, and update Z-axis information corresponding to the plurality of points 10, 20, 30, 40, 50 based on the acquired height information.

The processor 130 may obtain minimum height information and maximum height information of the first object region and the second object region when the first object region and the second object region spaced apart from each other are identified based on the first height information and the second height information.

Specifically, the processor 130 may acquire height information about a lower surface 422 and an upper surface 421 of a plurality of objects. In FIG. 4B, a region corresponding to an object located at a relatively upper portion may be identified as a first object region, and a region corresponding to an object located at a relatively lower portion may be identified as a second object region.

The processor 130 may update Z-axis information corresponding to a plurality of points 10, 20, 30, 40, 50 based on the acquired height information. Accordingly, the electronic apparatus 100 may generate a map reflecting an accurate location of an object located in a space.

Figure 4C:
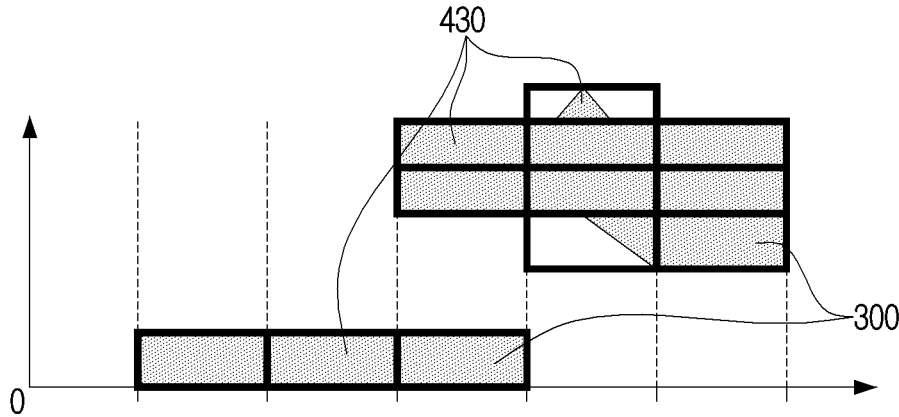

FIG. 4C is a diagram illustrating a method of generating map data through voxel corresponding to the object located in a space.

A voxel may be used to render an object having a volume element, and it is meant that a two-dimensional pixel is implemented in a three-dimensional form. That is, the voxel may be a unit having a volume generated as a result of dividing a space by a predetermined method. A voxel may have a rectangular parallelepiped shape capable of filling a space without a gap.

Referring to FIG. 4C, the processor 130 may update Z-axis information based on information about a plurality of voxels 430 corresponding to an object 300 located in a space. The plurality of voxels 430 may be a single standard having the same size and shape, but may have different sizes and shapes as illustrated.

As a result, the electronic apparatus 100 may generate map data in which the actual shape of the object 300 located in the space is specifically reflected.

Figure 4D:
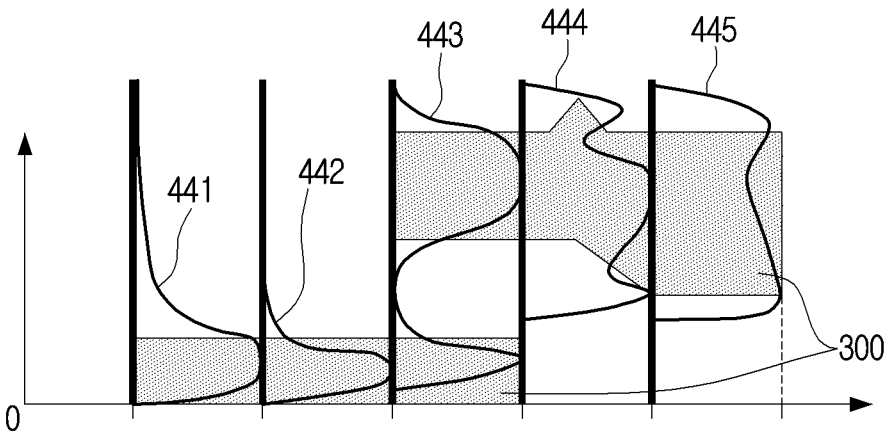

FIG. 4D is a diagram illustrating a method of generating map data based on probability distribution of a region in which an object is located.

The processor 130 may obtain a probability distribution corresponding to each of a plurality of points 10, 20, 30, 40, 50 based on first height information and second height information, and update Z-axis information corresponding to each of the plurality of points 10, 20, 30, 40, 50 based on the acquired probability distribution.

Referring to FIG. 4D, the processor 130 may obtain probability distributions 441, 442, 443, 444, and 445 on a plurality of points 10, 20, 30, 40, and 50, respectively. The probability distribution may be a probability distribution corresponding to Z-axis information for a plurality of points, and may be a probability distribution indicating a probability that the object 300 is located within a Z-axis range included in the Z-axis information.

The processor 130 may identify, as a region in which an object is located, only a range in which the probability of probability distribution among Z-axis ranges corresponding to each point is greater than or equal to a threshold value, based on probability distributions 441, 442, 443, 444, 445. The processor 130 may identify a region in which the object is located based on the variance value for the probability distribution.

The processor 130 may update Z-axis information corresponding to each of a plurality of points 10, 20, 30, 40, 50 based on a Z-axis range identified as a region in which an object is located with respect to a plurality of points 10, 20, 30, 40, 50.

Typically, the camera 120 provided in the electronic apparatus 100 has measurement errors caused by various factors, and when the Z-axis information is updated based on probability distribution, map data reflecting the location of an object located in an indoor space may be generated in spite of a measurement error of the camera 120.

Figure 5:
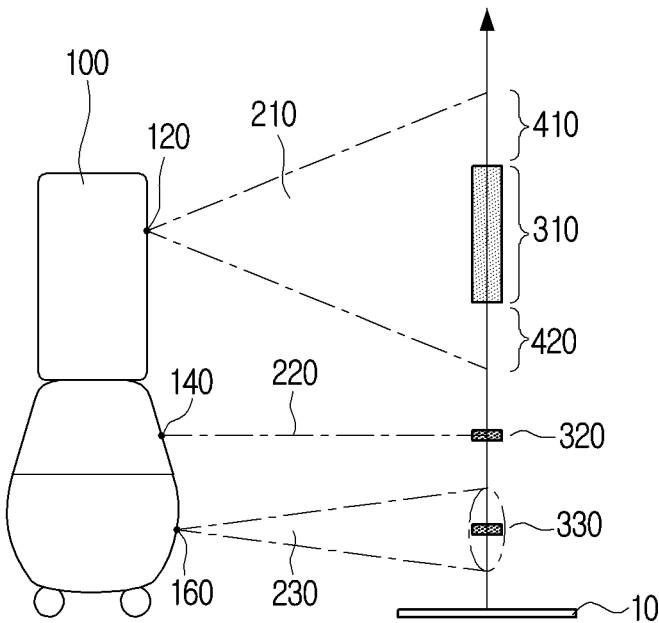
FIG. 5 is a diagram illustrating a method of identifying an object using various types of sensors provided by the electronic apparatus according to an embodiment of the disclosure.

FIG. 5 is a diagram illustrating a method of identifying an object using various types of sensors provided by the electronic apparatus according to an embodiment of the disclosure.

Referring to FIG. 5, the electronic apparatus 100 may include the camera 120, a LiDAR sensor 140, and a sonar 160.

The camera 120 may be implemented as a depth camera. The camera 120 may have an FoV 210 represented by a region between an upper surface and a lower surface. The electronic apparatus 100 may acquire height information about an object 310 and an empty space 410, 420 included in the point 10 in an image acquired through the camera 120.

The LiDAR sensor 140 may have a linear FoV 220 since only one direction irradiates an optical pulse. The electronic apparatus 100 may acquire height information about an object 320 included in one point 10 from an image acquired through the LiDAR sensor 140. In this case, the height information of the object 320 obtained by the electronic apparatus 100 includes only information about one Z value, but the accuracy of the measurement may be increased.

A sonar 160 may be an equipment capable of measuring the orientation and distance of an object by sound waves. The sonar 160 may have a conical FoV 230 unlike the camera 120. The electronic apparatus 100 may obtain height information about an object 330 included in the one point 10 in an image obtained through the sonar 160.

The electronic apparatus 100 may set, as a measurement FoV, only a region in which the reliability of measurement is greater than or equal to a threshold value among the FoV 230 of the sonar, and update map data corresponding to the one point 10 based on the height information of the object 330 acquired within the measurement FoV. The measurement angle may have a quadrangular pyramid shape like the camera 120.

The electronic apparatus 100 updates map data based on height information about an object included in the FoV of the measurement device in consideration of the FoV characteristics of the measurement device such as the camera 120, the LiDAR sensor 140, and the sonar 160, thereby generating map data that may be utilized for driving of the electronic apparatus having different FoV characteristics of the measurement device provided with the measurement device on the device.

Figure 6A:
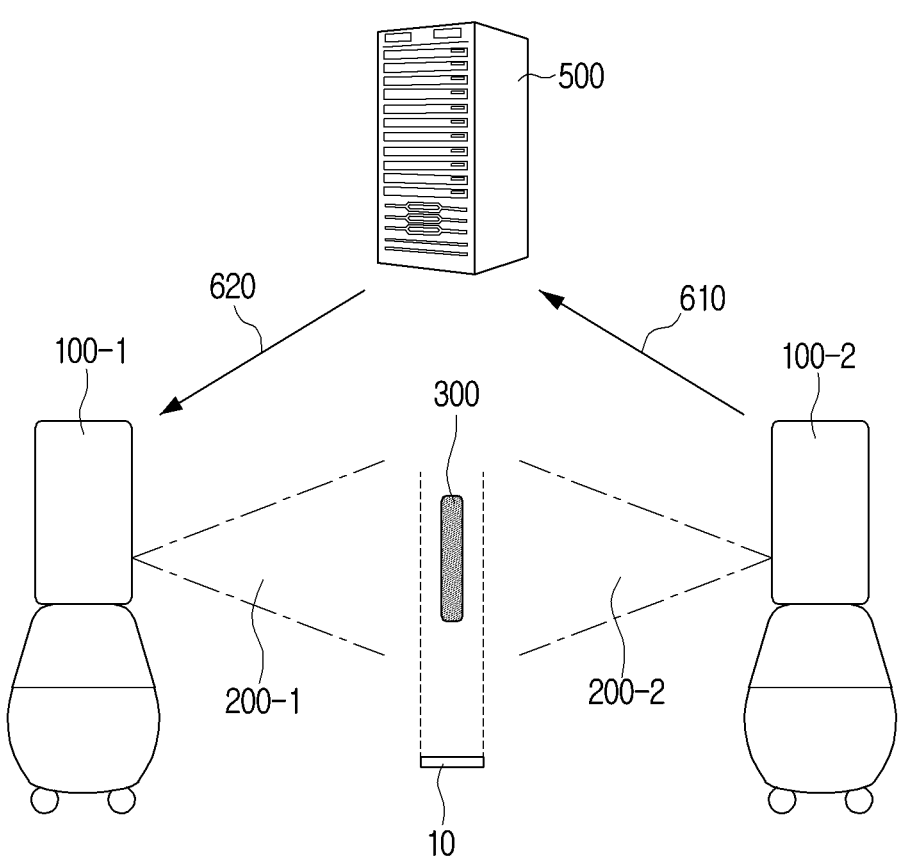
FIGS. 6A and 6B are diagrams illustrating communication connection between an electronic apparatus and an external device according to an embodiment of the disclosure.
Figure 6B:
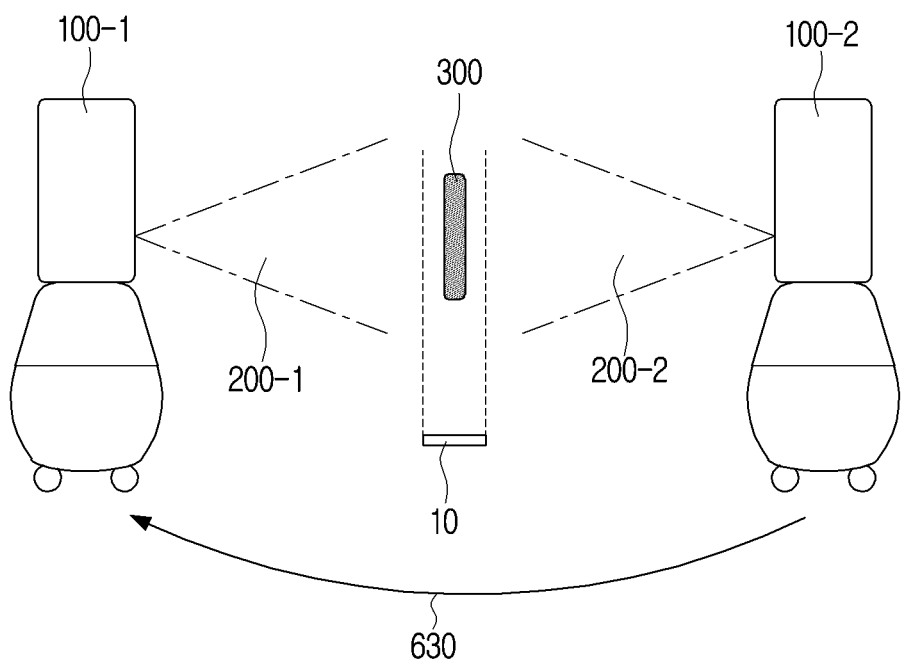

FIGS. 6A and 6B are diagrams illustrating communication connection between an electronic apparatus and an external device according to an embodiment of the disclosure.

The electronic apparatus 100 may include a communication interface. When height information for the one point 10 of map data is received from an external device, the electronic apparatus 100 may update Z-axis information corresponding to one point based on the received height information.

FIG. 6A illustrates a server 500 corresponding to an external device. The plurality of robots 100-1, 100-2 located in the indoor space may acquire height information of the object 300 included in the one point 10 based on an FoV 200-1, 200-2 characteristic of each robot. The robot 100-1 located in the indoor space may update map data corresponding to the one point 10 based on height information of the object 300 acquired by itself and height information of the object 300 acquired by another robot 100-2.

The another robot 100-2 located in an indoor space may transmit 610 height information on the object 300 obtained by itself to the server 500. The server 500 may transmit (620) update information to one robot 100-1 based on the information received from the other robot 100-2 and the map data stored in the server 500.

Referring to FIG. 6B, one robot 100-1 located in an indoor space may receive height information of the object 300 directly from the other robot 100-2 (630). The robot 100-1 may update map data corresponding to the one point 10 based on the received height information and self-acquired height information.

Figure 7:
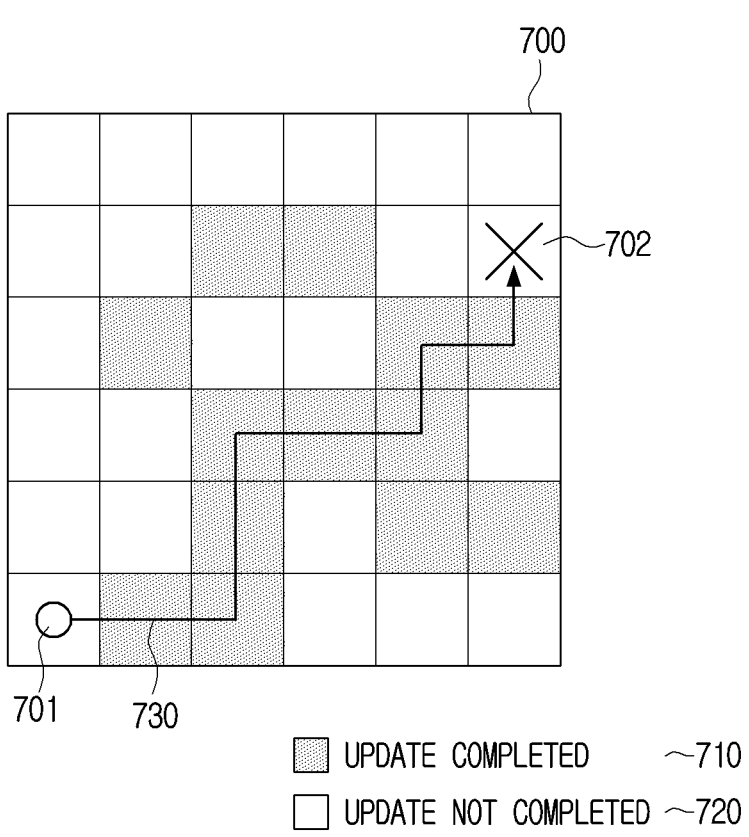
FIG. 7 is a diagram illustrating a method of setting a travelling path according to an embodiment of the disclosure.

FIG. 7 is a diagram for describing a driving route setting method according to an embodiment of the disclosure. FIG. 7 illustrates a travel map 700 in which a travel path 730 from a departure point 701 to a destination 702 is displayed. The map data stored in the memory 110 of the electronic apparatus 100 may include X-axis information and Y-axis information corresponding to each point on the travel map 700.

In the electronic apparatus 100, when Z-axis information corresponding to one point of map data is updated for all Z-axis ranges, the electronic apparatus 100 may identify a corresponding point as a point 710 in which an update is completed.

The point 710 in which the update is completed may be a point where an obstacle disturbing the driving of the electronic apparatus 100 is located or may be a point composed of only an empty space without an obstacle. In contrast, since the point 720 at which the update is not completed has not been updated for all Z-axis ranges, the electronic apparatus 100 cannot determine that the obstacle is not located at the point 720 even if the obstacle has not been identified in the updated Z-axis range.

In this case, in this case, the electronic apparatus 100 may identify the point 720 in which the update is not completed as a region in which the update is not completed, and may set the traveling path 730 to the destination 702 by avoiding the corresponding points 720. Specifically, the electronic apparatus 100 may set a traveling path 730 based on a location of a point, in which an obstacle is not included, from among the points 710 on which the update is completed.

Figure 8A:
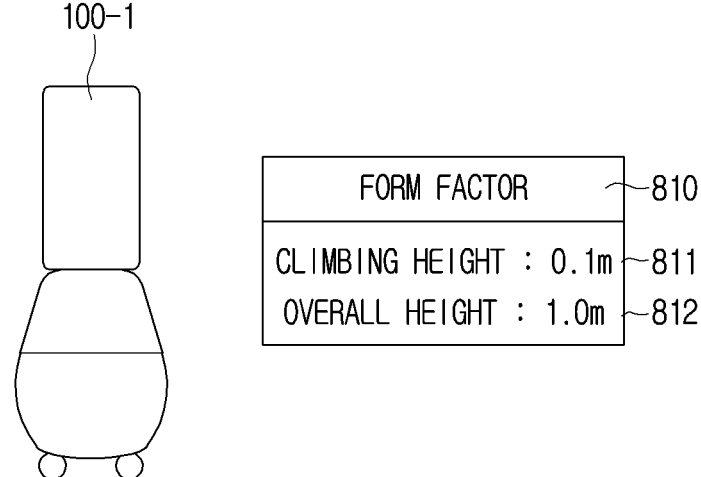
FIGS. 8A and 8B are diagrams illustrating a method of setting a path in consideration of a form factor of an electronic apparatus according to an embodiment of the disclosure.
Figure 8B:
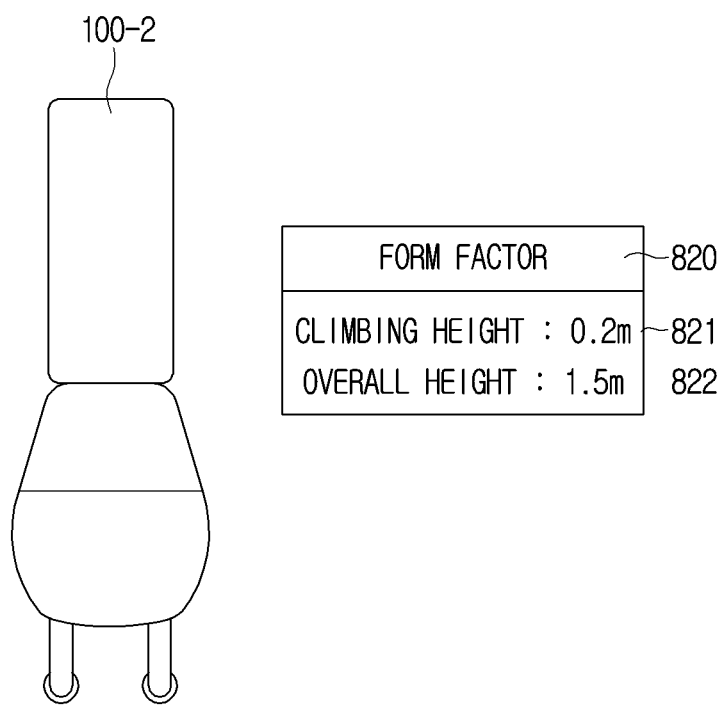

FIGS. 8A and 8B are diagrams illustrating a method of setting a path in consideration of a form factor of an electronic apparatus according to an embodiment of the disclosure. In FIGS. 8A and 8B, it is described that the electronic apparatus 100 is a robot.

A form factor refers to a structured form of the robot 100, and includes characteristics of a shape, a size, and a driver of the robot 100. The form factor information may include information on a height (hereinafter referred to as "climbing height") through which the robot 100 may pass an object located at the bottom of the indoor space and a height (hereinafter, referred to as "overall height") of the robot 100.

The climbing height may be a height determined based on the characteristics of the driver, and whether the robot 100 may pass an object located in the ceiling may be determined based on the overall height of the robot 100. The robot 100 may set a traveling path by identifying an object that interferes with driving of the robot, that is, an obstacle, based on the updated map data and form factor information of each robot.

FIG. 8A illustrates a robot 100-1 having a relatively small size and form factor information 810 corresponding thereto. The robot 100-1 may have form factor information 810 corresponding to a climbing height 811 of 0.1 m and an overall height 812 corresponding to 1.0 m.

For example, if an object included in one point of map data is located at 0 m to 0.1 m and 1.2 m to 3 m, the robot 100-1 may climb an object located from the floor up to a height of 0.1 m, and since an object is not located in a Z-axis range lower than the height 1.0 m of the robot, the corresponding point may be identified as a drivable region in which the obstacle is not located to set a traveling path.

FIG. 8B shows a robot 100-2 having a relatively large size and form factor information 820 corresponding thereto. The robot 100-2 may have form factor information 810 corresponding to a climbing height 821 of 0.2 m and an overall height 822 corresponding to 1.5 m.

If an object included in one point of map data is located at 0 m to 0.1 m and 1. 2 m to 3 m as illustrated in FIG. 8A, the robot 100-2 may set a traveling path by identifying a corresponding point as a non-traveling region in which an obstacle is located since an object is located in a Z-axis range lower than the height (1.5 m) of the robot.

The map data generated by the robot 100 may be generated based on height information of an object included in the FoV of a sensor provided in the robot 100, and thus various robots having different form factor information may set a traveling path based on updated map data and form factor information of each robot.

Figure 9:
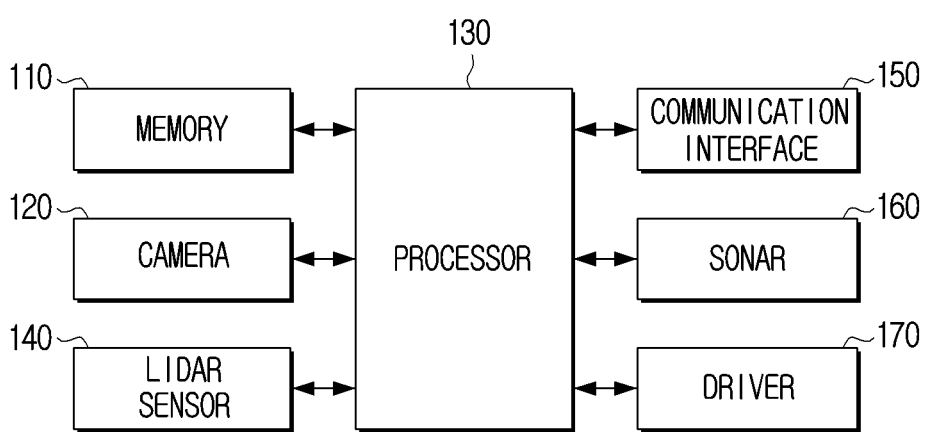
FIG. 9 is a block diagram specifically describing a functional configuration of an electronic apparatus according to an embodiment of the disclosure.

FIG. 9 is a block diagram specifically describing a functional configuration of an electronic apparatus according to an embodiment of the disclosure.

According to FIG. 9, an electronic apparatus 100' includes the memory 110, the camera 120, the processor 130, a LiDAR sensor 140, a communication interface 150, a sonar 160, and a driver 170. In the configuration illustrated in FIG. 9, a detailed description of a configuration overlapping with the configuration shown in FIG. 2 will be omitted.

The communication interface 150 may input and output various types of data. For example, the communication interface 150 may transmit and receive various types of data from an external device (for example, a source device), an external storage medium (for example, a universal serial bus (USB) device), an external server (for example, a web hard) through communication methods such as, for example, and without limitation, an access point (AP)-based Wi-Fi (wireless LAN network), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, or coaxial.

The driver 170 may be a device capable of driving the electronic apparatus 100, and according to the control of the processor 130, the driver 170 may adjust the traveling direction and the traveling speed. The driver 170 may include a power generating device to generate power for driving the electronic apparatus 100 (e.g., a gasoline engine, a diesel engine, a liquefied petroleum gas (LPG) engine, an electric motor, etc. depending on used fuel (or energy source)) and a steering device (e.g., a mechanical steering, a hydraulics steering, an electronic control power steering (EPS)), a traveling device (for example, a wheel, a propeller, etc.) for traveling the electronic apparatus 100 according to power. The driver 170 may be modified according to a driving type (e.g., a wheel type, a walking type, a flight type, etc.) of the electronic apparatus 100.

Figure 10:
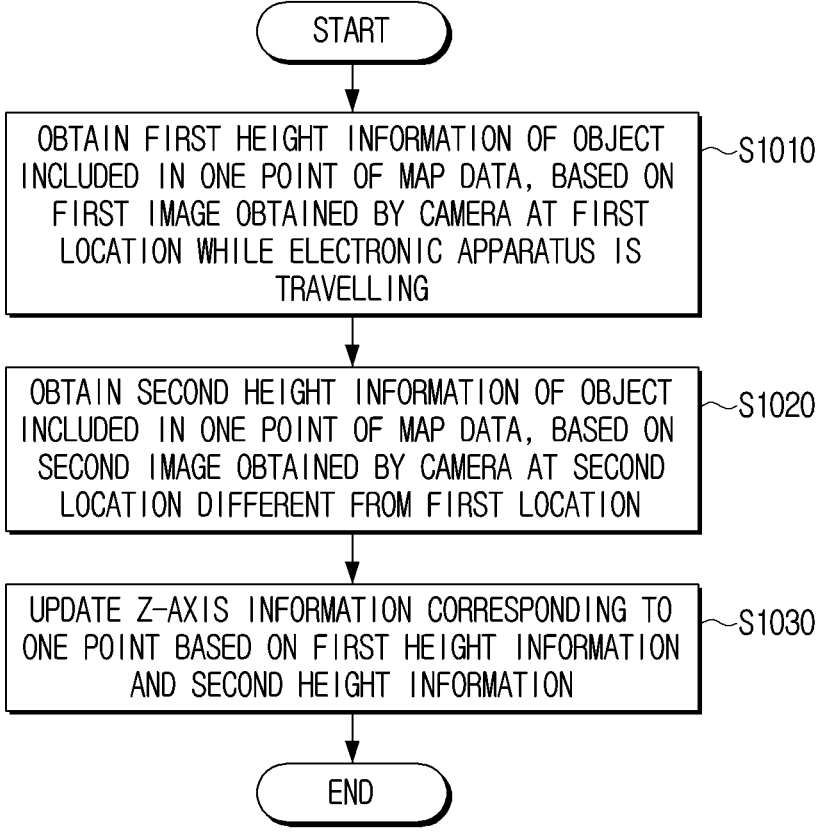
FIG. 10 is a flowchart illustrating a method of controlling according to an embodiment of the disclosure.

FIG. 10 is a flowchart illustrating a method of controlling according to an embodiment of the disclosure.

A controlling method of an electronic apparatus includes obtaining first height information of an object included in one point of the map data, based on a first image obtained by the camera at a first location while the electronic apparatus is travelling in operation S1010. The method includes obtaining second height information of the object included in one point of the map data, based on a second image obtained by the camera at a second location different from the first location in operation S1020. The method may include updating the Z-axis information corresponding to one point based on the first height information and second height information in operation S1030.

The second height information obtained by the second image may include third height information other than the first height information obtained by the first image, and the controlling method may further include additionally updating Z-axis information corresponding to the one point based on the third height information.

The updating the Z-axis information in operation S1030 may include updating Z-axis information corresponding to the one point based on maximum height information and minimum height information obtained based on the first height information and the second height information.

The updating the Z-axis information in operation S1030 may include, based on a plurality of objects being identified based on at least one of the first image or the second image, obtaining height information of each of the plurality of objects based on the first height information and the second height information; and updating Z-axis information corresponding to the one point based on the obtained height information.

The updating the Z-axis information in operation S1030 may include, based on a first object region and a second object region spaced apart from each other being identified based on the first height information and the second height information, obtaining minimum height information and maximum height information of the first object region; obtaining minimum height information and maximum height information of the second object region; and updating Z-axis information corresponding to the one point based on the obtained information.

The updating the Z-axis information in operation S1030 may include obtaining a probability distribution corresponding to the one point based on the first height information and the second height information, and updating Z-axis information corresponding to the one point based on a variance value for the acquired probability distribution.

The method may further include obtaining fourth height information of an object included in one point of the map data based on a third image acquired by the LiDAR sensor, and updating Z-axis information in operation S1030 may include updating Z-axis information corresponding to the one point of the map data based on the obtained fourth height information.

The method may further include, based on receiving fifth height information about the one point of the map data from an external device, updating Z-axis information corresponding to the one point based on the received fifth height information.

The map data may further include X-axis information and Y-axis information, the X-axis information and the Y-axis information indicate one point on the map data, and the method may further include setting a travelling path of the electronic apparatus by avoiding a point where the update of the Z-axis information is not completed on the map data.

The method may further include setting a travelling path of the electronic apparatus based on form factor information of the electronic apparatus and the updated map data.

The methods according to various embodiments may be implemented as a format of software or application installable to a related art electronic apparatus.

The methods according to various embodiments may be implemented by software upgrade of a related art electronic apparatus, or hardware upgrade only.

In addition, the various embodiments described above may be performed through an embedded server provided in an electronic apparatus, or at least one external server.

The various embodiments described above may be implemented in a recordable medium which is readable by a computer or a device similar to the computer using software, hardware, or the combination of software and hardware. In some cases, embodiments described herein may be implemented by the processor itself. According to a software implementation, embodiments such as the procedures and functions described herein may be implemented with separate software modules. Each of the software modules may perform one or more of the functions and operations described herein.

According to various embodiments described above, computer instructions for performing processing operations of the electronic apparatus 100 according to the various embodiments described above may be stored in a non-transitory computer-readable medium. The computer instructions stored in the non-transitory computer-readable medium may cause a particular device to perform processing operations on the electronic apparatus 100 according to the various embodiments described above when executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, or ROM.

While example embodiments of the disclosure have been illustrated and described, the disclosure is not limited to the specific embodiments described above. It will be understood by those skilled in the art that various changes in form and details may be made therein without departing from the true spirit and full scope of the disclosure, including the appended claims and their equivalents.

What is claimed is:

1. A robot comprising:
a memory storing map data corresponding to a traveling space, the map data comprising Z-axis information;
a camera; and
a processor configured to:
cause the robot to travel to a first location and capture a first image by the camera at a first point in time when the robot is at the first location;
cause the robot to travel to a second location and capture a second image by the camera when the robot is at the second location different from the first location at a second point in time different from the first point in time;
use the first image to obtain first height information of an object included in one point of the map data;
use the second image to obtain second height information of the object included in the one point of the map data;
obtain third height information based on the first height information and the second height information, wherein the third height is a part not included in the first height information, from among second height information included in the second image acquired at the second location,
update the Z-axis information corresponding to the one point based on the first height information and the third height information;
determine, based on the Z-axis information corresponding to the one point, whether the one point of the map data is a drivable region that will not interfere with the driving of the robot;
based on determining the one point of the map data is not a drivable region, set a travelling path of the robot to avoid the one point in the map data; and
control the robot to navigate the travelling path,
wherein the robot further comprises a communication interface, and
wherein the processor is further configured to execute the instructions to cause the robot to:
receive fifth height information about the one point of the map data from another robot, and
update the Z-axis information corresponding to the one point based on the received fifth height information and at least one from among the first height information and the third height information.

2. The robot of claim 1, wherein the processor is further configured to update the Z-axis information corresponding to the one point based on maximum height information and minimum height information that are obtained based on the first height information and the second height information.

3. The robot of claim 1, wherein the processor is further configured to:
based on a plurality of objects being identified based on at least one of the first image or the second image, obtain height information of each of the plurality of objects based on the first height information and the second height information, and
update the Z-axis information corresponding to the one point based on the obtained height information.

4. The robot of claim 1, wherein the processor is further configured to:
identify a first object region and a second object region based on the first height information and the second height information, the first object region being spaced apart from the second object region,
obtain minimum height information of the first object region and maximum height information of the first object region,
obtain minimum height information of the second object region and maximum height information of the second object region, and
update the Z-axis information corresponding to the one point based on the minimum height information of the first object region, the maximum height information of the first object region, the minimum height information of the second object region, and the maximum height information of the second object region.

5. The robot of claim 1, wherein the processor is further configured to:
obtain a probability distribution corresponding to the one point based on the first height information and the second height information, and
update the Z-axis information corresponding to the one point based on a variance value for the probability distribution.

6. The robot of claim 1, further comprising:
a light detection and ranging (LiDAR) sensor,
wherein the processor is further configured to:
obtain fourth height information of a second object
included in the one point of the map data based on a
third image acquired by the LiDAR sensor, and
update the Z-axis information corresponding to the one
point of the map data based on the obtained fourth
height information.
7. The robot of claim 1, wherein the map data further
comprises X-axis information and Y-axis information,
wherein the X-axis information and the Y-axis informa-
tion indicate the one point on the map data, and
wherein the processor is further configured to set the
travelling path of the robot to avoid another point in the
map data where the Z-axis information has not com-
pleted an update.
8. The robot of claim 7, wherein the processor is further
configured to set the travelling path of the robot based on
form factor information of the robot and the map data after
the map data has been updated.
9. A method of controlling a robot, the method compris-
ing:
causing the robot to travel to a first location and capture
a first image by a camera at a first point in time when
the robot is at the first location;
causing the robot to travel to a second location and
capture a second image by the camera when the robot
is at the second location different from the first location
at a second point in time different from the first point
in time;
using the first image to obtain first height information of
an object included in one point of the map data;
using the second image to obtain second height informa-
tion of the object included in the one point of the map
data;
obtaining third height information based on the first
height information and the second height information,
wherein the third height is a part not included in the first
height information, from among second height infor-
mation included in the second image acquired at the
second location;
updating the Z-axis information corresponding to the one
point based on the first height information and the third
height information;
determining, based on the Z-axis information correspond-
ing to the one point, whether the one point of the map
data is a drivable region that will not interfere with the
driving of the robot;
based on determining the one point of the map data is not
a drivable region, setting a travelling path of the robot
to avoid the one point in the map data; and
controlling the robot to navigate the travelling path,
wherein the updating the Z-axis information comprises:
receiving fifth height information about the one point of
the map data from another robot; and
updating the Z-axis information corresponding to the
one point based on the received fifth height infor-
mation and at least one from among the first height
information and the third height information.
10. The method of claim 9, wherein the updating the
Z-axis information comprises updating the Z-axis informa-
tion corresponding to the one point based on maximum height information and minimum height information that are
obtained based on the first height information and the second
height information.
11. The method of claim 9, wherein the updating the
Z-axis information comprises:
based on a plurality of objects being identified based on
at least one of the first image or the second image,
obtaining height information of each of the plurality of
objects based on the first height information and the
second height information; and
updating the Z-axis information corresponding to the one
point based on the obtained height information.
12. The method of claim 9, wherein the updating the
Z-axis information comprises:
identifying a first object region and a second object region
based on the first height information and the second
height information, the first object region being spaced
apart from the second object region;
obtaining minimum height information of the first object
region and maximum height information of the first
object region;
obtaining minimum height information of the second
object region and maximum height information of the
second object region; and
updating the Z-axis information corresponding to the one
point based on the minimum height information of the
first object region, the maximum height information of
the first object region, the minimum height information
of the second object region, and the maximum height
information of the second object region.
13. The method of claim 9, wherein the updating the
Z-axis information comprises:
obtaining a probability distribution corresponding to the
one point based on the first height information and the
second height information, and
updating the Z-axis information corresponding to the one
point based on a variance value for the probability
distribution.
14. The method of claim 9, wherein the updating the
Z-axis information comprises:
obtaining fourth height information of a second object
included in the one point of the map data based on a
third image acquired by a light detection and ranging
(LiDAR) sensor of the robot, and
updating the Z-axis information corresponding to the one
point of the map data based on the obtained fourth
height information.
15. The method of claim 9, wherein the map data further
comprises X-axis information and Y-axis information,
wherein the X-axis information and the Y-axis informa-
tion indicate the one point on the map data, and
wherein the method further comprises setting the travel-
ling path of the robot to avoid another point in the map
data where the Z-axis information has not completed an
update.
16. The method of claim 15, wherein the method further
comprises setting the travelling path of the robot based on
form factor information of the robot and the map data after
the map data has been updated.

* * * * *